Dec. 20, 1966   E. W. WELLS ET AL   3,293,107
CORRUGATED PAPERBOARD
Filed Jan. 30, 1963
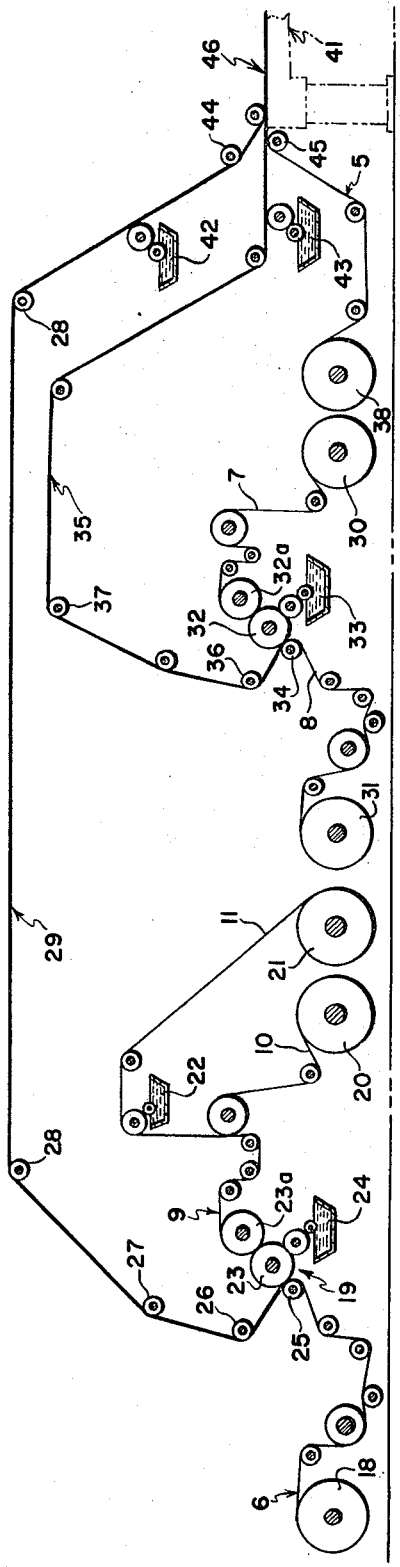
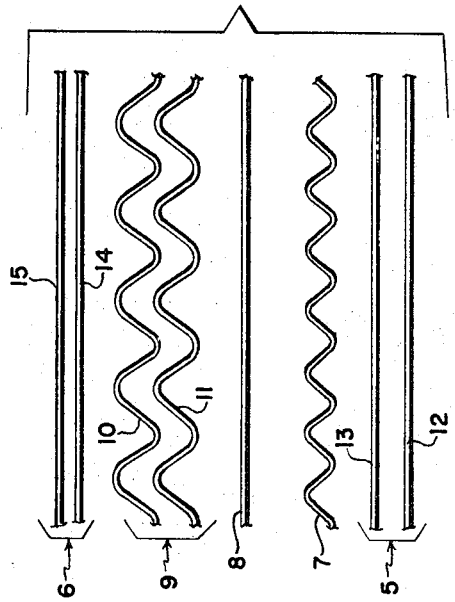
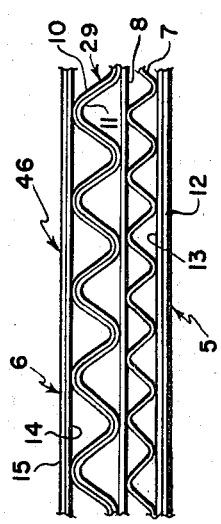
INVENTORS
EARL W. WELLS
DELBERT A. THEOBALD
BY *Richard W. Carpenter*
ATTORNEY

United States Patent Office 3,293,107
Patented Dec. 20, 1966

3,293,107
CORRUGATED PAPERBOARD
Earle W. Wells, Willow Grove, Pa., and Delbert A. Theobald, Fernandina Beach, Fla., assignors to Container Corporation of America, Chicago, Ill., a corporation of Delaware
Filed Jan. 30, 1963, Ser. No. 254,985
1 Claim. (Cl. 161—137)

The present invention relates to corrugated board for the manufacture of containers, and more particularly to multiple wall corrugated board formed of built-up layers of liner board and corrugated mediums.

The principal object of the invention is to provide an improved multi-wall corrugated board that has a high degree of strength and rigidity for a minimum total weight and thickness of the board when employing components of a given weight, caliper and test.

Another object is to provide an improved, high strength, multi-wall corrugated board, which is particularly well suited for the construction of large, bulk-type containers to hold granular or powdered materials, such as flour and various chemical products, in the packaging of which an important consideration is to minimize the bulging of relatively wide panels during handling and shipment of such packaged materials.

An additional object of the invention is to provide a form of double wall corrugated board that can be effectively produced on basic double wall equipment and at the same time will result in the production of board having strength and rigidity factors approaching that of triple wall board which has three separate corrugated medium layers and consequently is of greater total thickness and weight.

A further object of the invention is to provide an improved double wall corrugated board which has a total thickness substantially the same as that of present standard 600 pound test, double-wall board and which results in a board with greatly increased rigidity as well as puncture and crush resistance withonly a relatively small increase in the total weight of paperboard fibres.

A still further object of the invention is to provide a novel method of forming the improved construction of double wall corrugated paperboard to provide for a maximum strength and rigidity of board based on a given total thickness and total fibre weight of combined board.

Other and more specific objects and advantages of the invention will become apparent as the description proceeds.

In the drawings—

FIGURE 1 is a schematic cross-sectional view of double wall corrugated paperboard made in accordance with the invention;

FIGURE 2 is an exploded schematic cross-sectional view of the parts of the board separated from each other but in their relative positions; and FIGURE 3 is a schematic side elevational view of assembly mechanism that may conveniently be employed in carrying out the method of assembling the corrugated board herein disclosed.

In the manufacture of corrugated paperboard for large size bin-like containers produced for the retention and shipment of granular or powdered material, it is important to so construct the board as to have a high degree of rigidity or stiffness and also to have a high resistance to crushing or disrupting. It is also a prime consideration to employ board for such large size boxes that is as thin as possible, consistent with the required qualities of strength and stiffness.

Another prime consideration is to provide a form of double wall corrugated board that can readily be fabricated on standard double wall corrugating equipment, but which will have strength and rigidity factors favorably approaching those of triple wall corrugated board.

In the production of corrugated paperboard the corrugated layer or medium, as a practical matter, must be shaped by passing the web between meshing, fluted corrugating rolls and, as soon as the medium so formed or shaped emerges from between these rolls, a coating of adhesive is applied to the crests of the corrugations and the board is immediately brought into contact with and held against a plain liner board. The combined webs or sheets are then advanced in undisturbed relation a sufficient distance to allow the adhesive to set. The single face board thus formed is then ready to be passed to another station where adhesive is applied to the crests of the exposed corrugations on the other side of the board, and another liner is brought against such exposed corrugations. Upon the application of the second liner, the combined elements are advanced along a straight path. The usual practice is to direct the combined board through a drying section where it is kept flat as it advances until the adhesive between all adjoining surfaces has become set.

In order to produce multi-wall corrugated board in the most efficient and economical manner it is necessary to provide for each single face group a separate set or unit of corrugating rolls and glue applicator. Thus, for double wall corrugated board two sets of corrugating units are required and, for triple wall board, three such units are necessary. A large number of existing corrugated board plants are equipped to produce double wall corrugated board but relatively few are equipped to produce the triple wall form. All units, as a practical matter, must be arranged in alignment and a plant set up only for the production of double wall board cannot readily produce the triple wall board without costly rearrangement of facilities and the addition of another corrugating unit.

The present invention, accordingly, contemplates the production of double wall corrugated board with such combinations of corrugated mediums and liners as to enable the user of a machine, equipped only for the manufacture of double wall board, to produce a form of such board that is closely comparable to existing triple wall board in its essential strength characteristics, even though it has one less layer of corrugated medium. Additionally, the present invention contemplates the production of an improved form of double wall corrugated board involving a small increase in total board area and total fibre weight, but which will result in substantially increased strength factors.

The preferred form of the double wall board of this invention, as shown in FIGURES 1 and 2, comprises outside liners indicated at a whole at 5 and 6, a corrugated layer 7, an inner liner 8, and a second corrugated layer indicated as a whole at 9, that is formed from two separate laminations 10 and 11.

The outside liners 5 and 6 preferably have a caliper or thickness of approximately .022 inch and a combined weight of approximately 84 pounds to approximately 90 pounds per 1000 square feet. These outside liners may conveniently be formed by laminating two lighter liners aggregating the total weight above mentioned. The separate layers of liner 5 are indicated at 12 and 13, and the layers forming the opposite liner 6 are indicated at 14 and 15.

The preferred method of producing the board of this invention may conveniently be carried out by the use of equipment such as illustrated in FIGURE 3. A roll 18, upon which the laminated liner 6 is stored, is supported so that the liner may be fed toward the corrugating unit, indicated generally at 19. The corrugating medium 9 is provided preferably from separate sheets 10 and 11 stored on rolls 20 and 21 respectively.

The sheet 11 as it leaves roll 21 passes a glue pot 22 at which a coating of adhesive is applied to the under side of the sheet. The sheet 10 is then brought into contact with sheet 11 and both sheets are immediately directed between corrugating rolls 23, 23a to form a composite corrugated medium of preferably A or C flute. Immediately after the corrugations are indented into the sheets, a coating of adhesive from glue pot 24 is applied to the ridges or crests of the corrugations. Following this, the composite sheet 9, formed from the two mediums 10 and 11, is brought into contact with the liner 6 between the rolls 23 and 25 and the assembled sheets with their adhesive still in tacky condition passup and along rolls 26, 27, and 28 toward the final assembly or combining station. During such travel the adhesive becomes set. The assembled sheets 6, 10 and 11 are indicated generally in FIGURE 3 at 29. This assembly may be referred to as a single face sheet in this state of production.

The medium 7 and the liner sheet 8 are stored on rolls 30 and 31 and, as the medium 7 leaves its roll 30 it passes between fluted corrugating rolls 32, 32a to indent the corrugations into the sheet, preferably in either B or C flute configurations, and thereafter adhesive is applied from glue pot 33 on the crests of the corrugations. The liner 8 after passing about roll 34 is joined with the medium 7 and the assembled single face sheet, indicated generally at 35, passes along rolls 36 and 37 toward the final combining station.

As best seen in FIGURES 1 and 2, the composite medium 9 has larger flute than the single medium 7, so that if medium 9 is of A flute configuration medium 7 may be of either C or B flute configuration, but if medium 9 is of C flute configuration then medium 7 is limited to B flute configuration.

If desired medium 7 may also be formed as a two-ply construction in the same manner as medium 9 without departing from the basic concept of the invention, because the final product will still have only two layers of corrugated medium and will be of substantially the same thickness.

The next step is to join the two single face sheets 29 and 35 and the liner 5 stored on roll 38. Just before the sheets 29 and 35 reach the final combining point of drier section, indicated generally at 41, they pass along the respective glue pots 42 and 43 at which adhesive is applied to the exposed crests of the corrugations on these single face sheets.

Single face sheet 29 is fed in below roll 44 and the liner 5 is fed above the roll 45, while the single face sheet 35 is directed so as to pass in between the single face sheet 29 and liner 5. The built-up assembly of sheets, indicated generally at 46, then moves into the drier section through which it travels until the adhesive has become set.

In the process of gluing and assembling the medium sheets 10 and 11, corrugating such sheets and immediately bringing them into adhesive contact with the liner sheet 6, the layers of adhesive tend to dry or set at approximately the same time. This is preferably timed to be completed while this assembly, which forms the single face sheet 29, is advancing in a fixed plane, such as indicated in FIGURE 3. By so forming this assembly of sheets, the two corrugated layers tend to interfit in what may be termed a relaxed condition and the same is true with respect to the assembly of the composite corrugated layer with the liner. Thus, all three of these webs or sheets, making up the single face sheet 29, become permanently joined with a substantial absence of internal tension.

As previously indicated, one or both of the outer liners may comprise a single sheet, but best results have been achieved by forming the board with two laminated outer liners, both of which are formed of two adhesively secured liner sheets each having a weight of approximately 42 pounds per 1000 square feet.

The composite corrugated layer, indicated at 9 and comprising sheets 10 and 11, is preferably formed from two mediums each having a weight of approximately 26 pounds per 1000 square feet. The center liner, indicated at 8, preferably has a weight of approximately 69 pounds per 1000 square feet, and the medium sheet, indicated at 7, preferably is thicker and stronger than the separate mediums in the composite corrugated layer 9, and has a weight of approximately 33 pounds per 1000 square feet.

Comparisons have been made between one form of the multiply corrugated board as disclosed herein and forms of triple wall corrugated board presently in use. One such form of triple wall board is made up from seven separate layers, three of which are corrugated medium and four of which are liners. The two outside liners have a weight of 90 pounds per 1000 square feet and the two inside liners have a weight of 42 pounds per 1000 square feet. The three medium layers each have a weight of 26 pounds per 1000 square feet. The average minimum so called Beach puncture test for this form of triple wall board is 1100 units compared with an average of 1000 units for the preferred form of board disclosed herein, even though the total thickness of the present board is approximately 55% of that of the triple wall board and the total weight of fibers in the present board is less than that of the triple wall board.

Comparisons have also been made between one form of the board, as herein disclosed, and other forms of double wall corrugated board. One form of double wall board now being widely used is made up with three liners each having a weight of 90 pounds per 1000 square feet and two corrugated layers of a weight of 26 pounds per 1000 square feet, one of the corrugated layers being formed with A flute corrugations and the other with B flute corrugations.

In the preferred form of multi-wall board herein disclosed there is used only slightly more fibres by weight than in the construction of double wall board currently used, as above referred to, but the average minimum Beach puncture test for the preferred form of board has been found to be approximately fiteen per cent greater. In addition, the board herein disclosed has been found to have substantially higher crush or deflection resistance lengthwise of the flutes than revealed under the same test conditions by the double-wall board, above referred to, now in wide use.

While the preferred form of multi-wall board herein disclosed has somewhat lower strength qualities than board made of three separate corrugated layers, it has definite compensating factors, such as requiring much less space for its production equipment. Since it is of less thickness, appreciably less warehouse space is required for storage of containers in flat or collapsed condition. The board of this invention folds more easily along score lines and there is a better fit in the container covers on regular slotted type containers.

Advantages over presently used double wall board are the greatly increased stiffness and resistance to crushing against force applied against the edges of the board and lengthwise of the flutes.

While there has been disclosed the preferred method and machine of the present invention and the multi-ply corrugated sheet produced thereby, it is apparent that various changes may be made therein without departing from the spirit of the invention as set forth in the appended claim.

What is claimed is:

A multi-ply sheet of corrugated paperboard comprising, in combination, two outer liners each formed from two laminated liner sheets and each having a combined weight of the order of 84 pounds to 90 pounds per 1000 square feet, a corrugated medium layer adhered to the inside surface of each of the composite outer liners, and a third inner liner adhered between the two corrugated medium layers, one of the corrugated medium layers being formed of two mediums laminated together and having a combined weight of at least approximately 52 pounds per 1000 square feet and a combined thickness of at least approximately .018 inch, the other corrugated layer being formed of a single medium having a weight of the order of 33 to 36 pounds per 1000 square feet and a thickness of approximately .012 inch, the two laminated corrugated mediums being adhesively interconnected, said one corrugated medium layer being substantially free from internal tension.

References Cited by the Examiner

UNITED STATES PATENTS

| | | | |
|---|---|---|---|
| 1,119,146 | 12/1914 | Ferres | 156—206 |
| 1,189,518 | 7/1916 | Wood | 156—206 |
| 2,222,573 | 11/1940 | Reger | 161—149 |
| 2,759,523 | 8/1956 | Goldstein et al. | 156—207 |
| 3,041,219 | 6/1962 | Steck | 161—113 |

EARL M. BERGERT, *Primary Examiner.*

H. F. EPSTEIN, *Assistant Examiner.*